July 11, 1950     C. E. STAFFORD     2,514,680
APPARATUS FOR TURNING CONTAINERS

Filed Jan. 13, 1944     4 Sheets-Sheet 1

INVENTOR.
Charles E. Stafford
BY
ATTORNEY

July 11, 1950 — C. E. STAFFORD — 2,514,680
APPARATUS FOR TURNING CONTAINERS
Filed Jan. 13, 1944 — 4 Sheets-Sheet 2
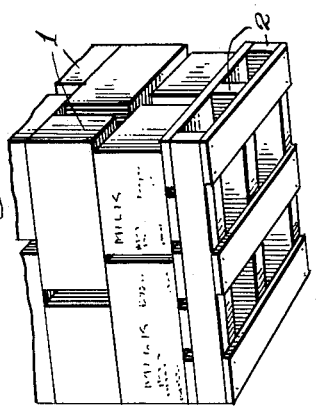
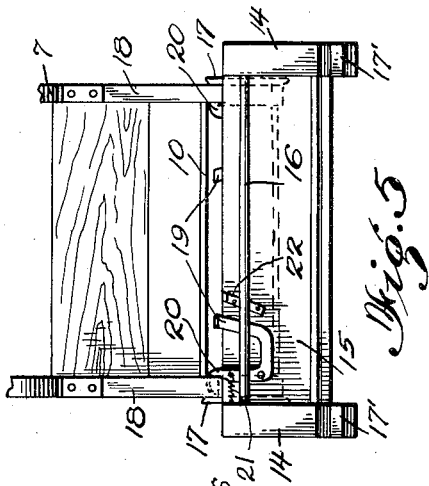
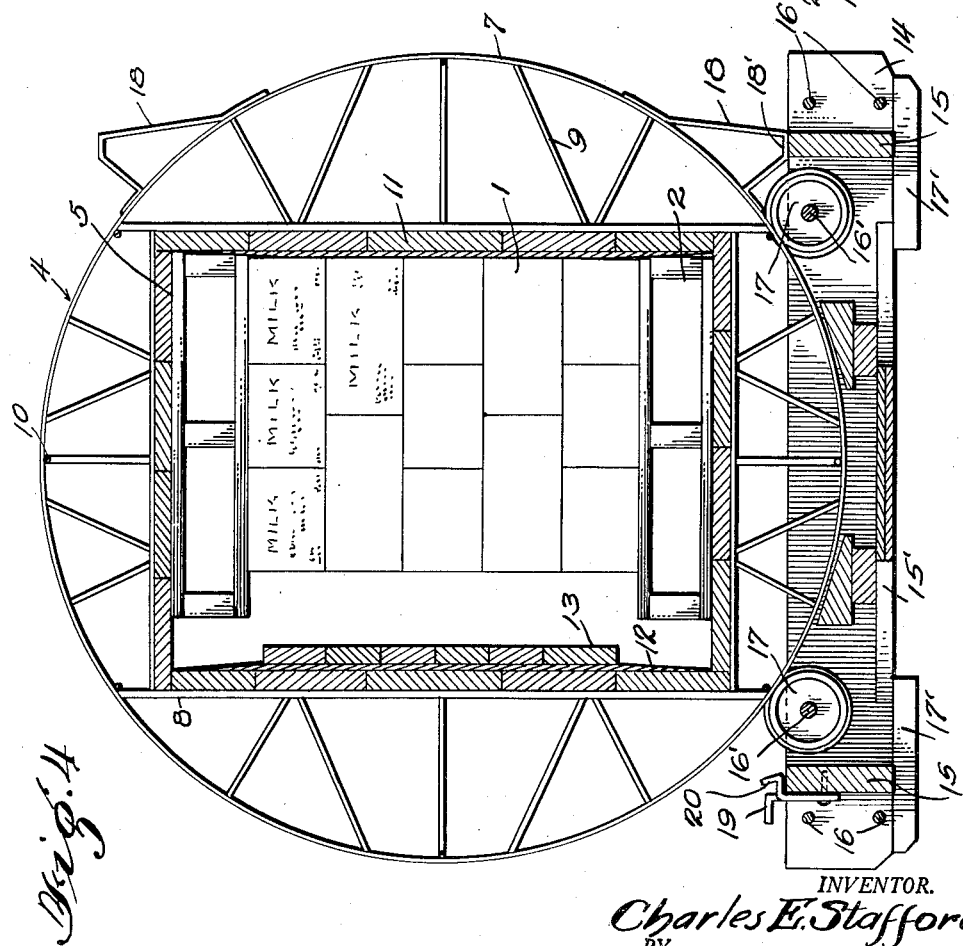
INVENTOR.
Charles E. Stafford
BY
ATTORNEY

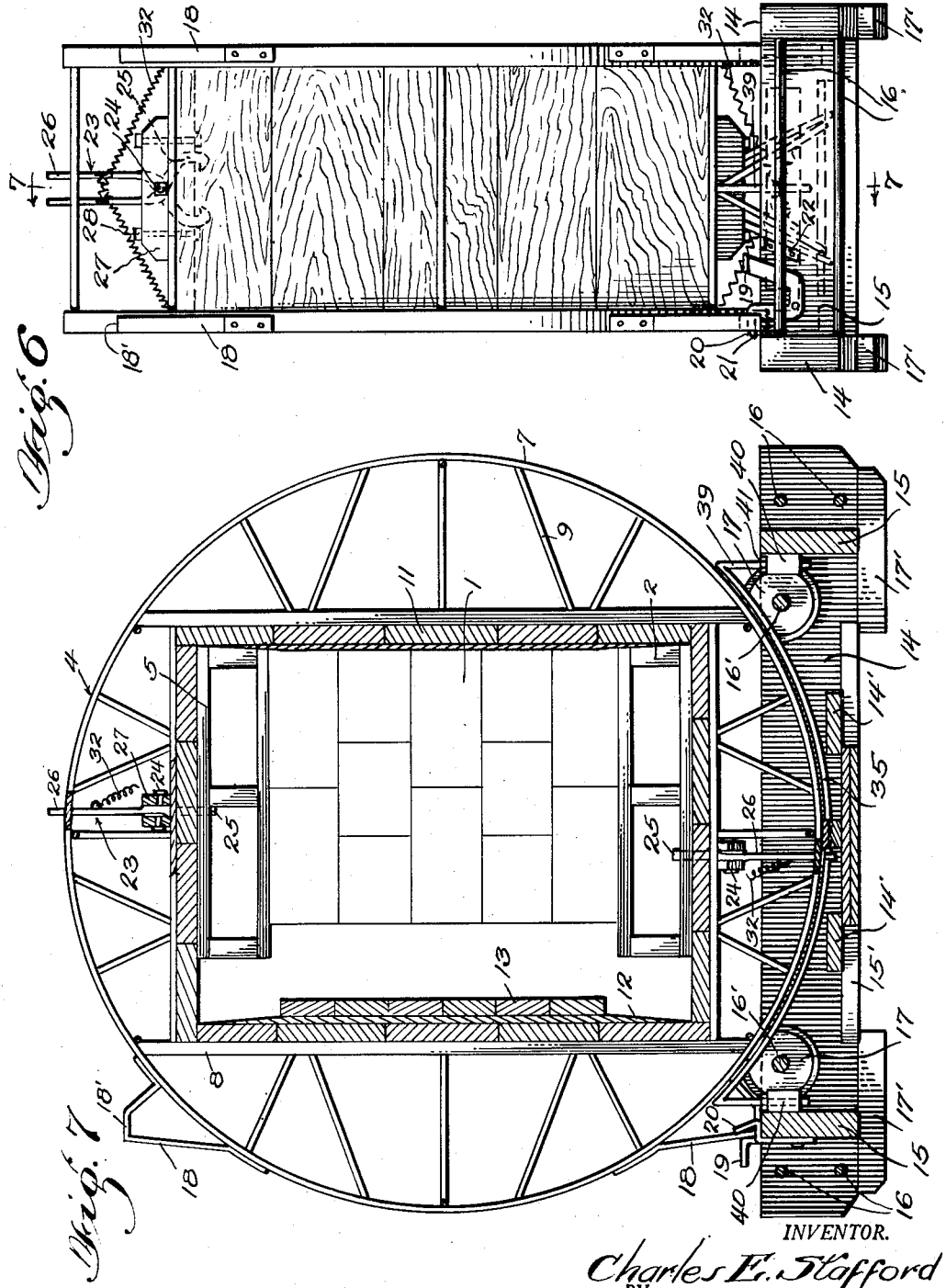

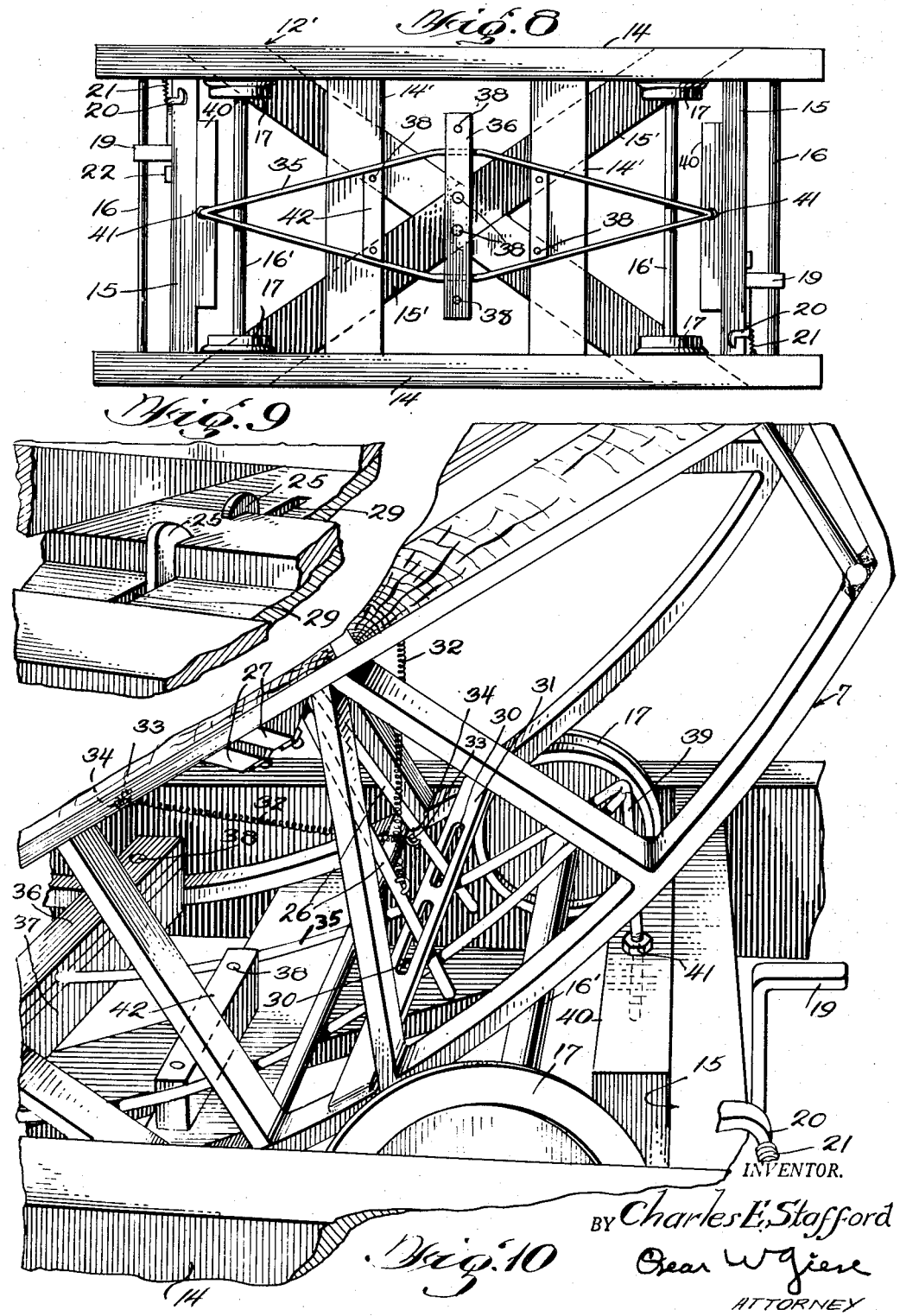

Patented July 11, 1950

2,514,680

UNITED STATES PATENT OFFICE 2,514,680

APPARATUS FOR TURNING CONTAINERS

Charles E. Stafford, United States Army,
Mira Loma, Calif.

Application January 13, 1944, Serial No. 518,086

20 Claims. (Cl. 259—57)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

This invention relates to an apparatus for turning packing cases and more particularly cases which are packed with cans, bottles, jars or boxes.

It is an object of the invention to provide an apparatus whereby a plurality of cases packed with cans of evaporated milk may be readily inverted.

Another object of the invention is to provide an apparatus by which a plurality of cases may be inverted in one operation.

A still further object of the invention is to provide an apparatus for inverting a plurality of packed cases which will be extremely simple and economical to practice and which is especially adapted to be used in warehouses.

Referring to the drawings:

Fig. 3 is a perspective view of a pallet with a plurality of cases stacked thereon.

Fig. 4 is a sectional view of the turning device.

Fig. 5 is a fragmentary end view of the turning device.

Fig. 6 is an end elevation of a modified form of turning device.

Fig. 7 is a sectional view on the line 7—7 of Fig. 6.

Fig. 8 is a top plan view of a modified form of support.

Fig. 9 is a fragmentary perspective view of the gripping jaws in locked position.

Fig. 10 is a perspective view of the under part of the modified turning device.

Evaporated milk is made up of substantially 24% solid matter and 76% water. If the containers which hold the milk, and which are usually in the form of cans, are allowed to stand for any great length of time, the solid matter tends to settle to the bottom of the cans with the result that the milk loses its flavor.

In storage of evaporated milk, particularly in warehouses, it has been found necessary to periodically turn the cases in which the cans of milk are packed so as to insure that the solid matter will not settle to the bottom of the cans. This procedure is usually carried out at least every 60 days.

The practice customarily followed in warehouses for turning cases containing the cans of evaporated milk is to manually pick up and invert each individual case separately. Consequently, by following the customary practice, considerable time is required in order to handle a quantity of cases.

In storing canned food stuffs, such as milk, in warehouses according to the present invention, a plurality of packed cases 1 are stacked on a pallet 2 as shown in Fig. 3, and two or more loaded pallets stacked upon one another. This procedure saves considerable space in the warehouses where the goods are stored as it is possible to stack loaded pallets to a considerable height. At the same time this makes it possible to readily handle a loaded pallet without the necessity of loading a pallet each time the occasion arises for moving a plurality of cases.

Figure 1:
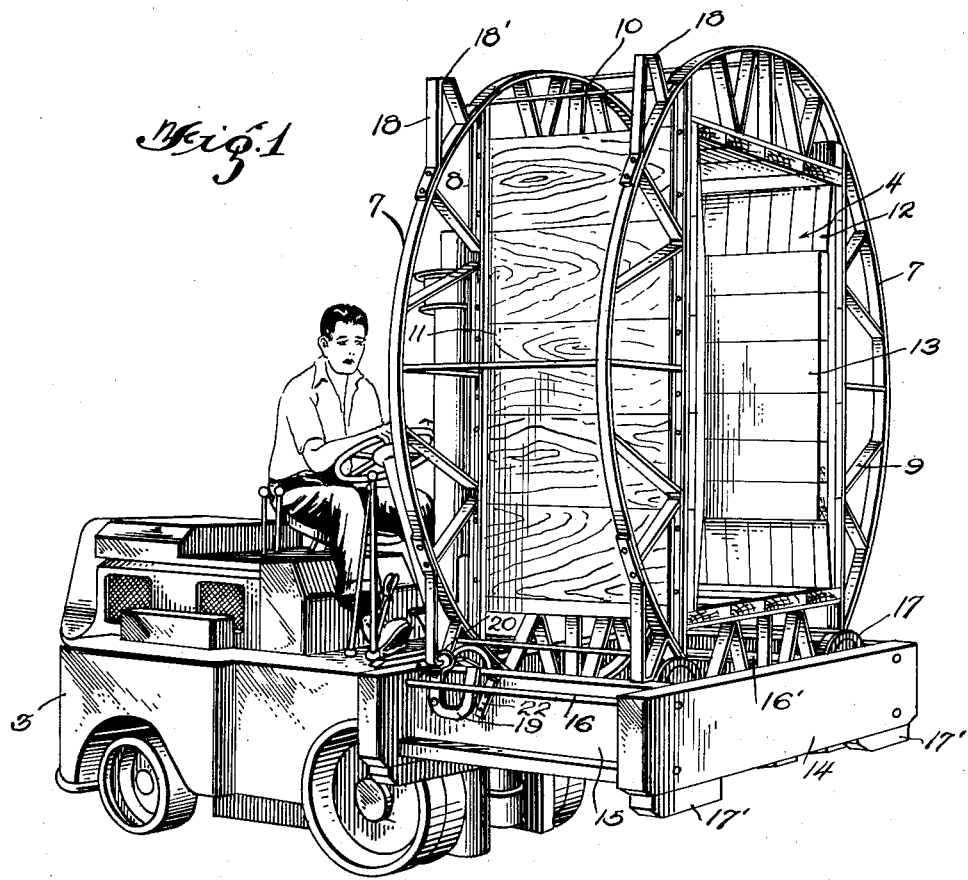
Fig. 1 is a perspective view of the improved turning device.

When it is desired to turn a plurality of cases, a loaded pallet, as shown in Fig. 3, is picked up by means of a lift truck 3 provided with the usual fork lifting elements and inserted in the turning device 4 shown in Fig. 1. After the loaded pallet is placed in the turning device, a second pallet 5 is placed face down on the top side of the pallet load as shown in Fig. 4. In some instances it may be desirable to place the pallet 5 on the load before the load is inserted into the turning device. The device 4 is then revolved, preferably 180°, or until the pallet load is inverted. The pallet load is then removed from the turning device by means of the lift truck, the pallet on top of the load removed, and the load restacked. Another loaded pallet may then be inserted in the turning device and the operation repeated.

In order to avoid any unnecessary shifting of the cases when the device is revolved, it has been found desirable to place the pallet loads into the turning device alternately against the left and right hand sides of the opening in the turning device. Since both sides of the turning device are open, it will be apparent that it is possible to unload the device from one side while a second load is being inserted into the device from the other side. This has great practical advantages, particularly in warehouses where thousands of cases must be turned periodically.

The turning device 4 preferably comprises a frame composed of two circular members 7 connected by any suitable means to vertical supports 8. In order to add rigidity to the device and at the same time connect the circular members together, braces or struts 9 and 10 are connected to the members 7 and 8. The interior of the frame is preferably lined with wood 11 so as to form a substantially rectangular box-like structure. A steel surface 12 preferably forms a lining for the wooden box. So that the pallet load will remain an equal distance from each edge of the pallet when the load is inverted, a projecting filler block 13 is secured to the surface 12.

The frame is adapted to be revolved on a support 12' which comprises side members 14 and end members 15 connected together by any suitable means. Cross members 15' and transverse members 14' add strength to the support intermediate the end members 15. Braces 16 may be connected to the ends of the side members to further strengthen the support. The side members 14 are adapted to receive shafts 16' on which are mounted a pair of flanged wheels or rollers 17 upon which the circular members 7 are adapted to revolve. Open faced stops 18, usually four in number, are connected by any desirable means to the outer surface of the circular members 7. In order that the support may be readily picked up and transported, as shown in Fig. 1, the bottom of the support and preferably the sides 14 are provided with feet 17' so as to raise the support from its supporting surface.

Figure 2:
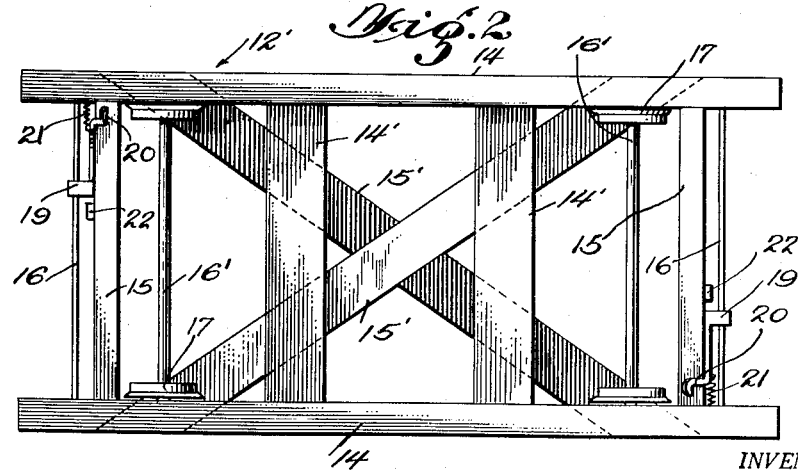
Fig. 2 is a plan view of the base of the device.

Referring to Figs. 2 and 5, one side of each of the end members of the support is provided with a spring latch comprising an operating member 19 and a hook 20 pivoted together. The hook 20 works against the tension of the spring 21 while the member 19 is limited in its movement away from the spring by the block 22.

In order that the hook portion 20 of the latch may readily grip the stop 18 so as to hold the turning device in a more or less stationary position during the loading or unloading of the device, it is desirable that the bottom of the stop 18' be substantially flat.

In the modified apparatus shown in Figs. 6 to 10, it is proposed to eliminate the service of one of the attendants whose services are required in the operation of the device shown in Figs. 1 to 5. Such services comprise placing the top pallet on the uppermost case before the cases are inverted and removing the top pallet from the cases after they have been inverted.

The turning apparatus disclosed in Figs. 6 to 10 is identical with the apparatus shown in Figs. 1, 2, 4 and 5 with the exception that the frame 4 is provided with gripping means for holding the pallets to the frame when the frame is rotated, and the support or base 12' is provided with means adapted to engage the gripping means on the frame so as to release the gripping means from the lowermost or supporting pallet in the frame after the frame has been rotated.

Referring to Figs. 6, 7 and 8 the top and bottom of the frame are provided with identical holding means preferably in the form of tongs 23 pivoted together at 24 so as to form gripping jaws 25 and handles 26.

The tongs 23 are attached to the frame by being held between braces 27 which are connected to the exterior of the frame by any suitable means such as bolts 28. The members 24 around which the jaws 25 pivot are adapted to pass through the braces while the jaws 25 extend through slots 29 in the frame so as to grip or hold the top of the uppermost pallet to the frame. The handles 26 are of sufficient length to allow them to pass through slots 30 in the braces 31 which may be secured to the inside of the circular members 7 by welding or the like. As a result, slots 30 not only act as guides for the handles but at the same time limit the movement of the handles.

In order that the jaws 25 may be closed, springs 32 having their ends provided with hooks 33 are connected to the handles by having one of their hooked ends engage the eyes 34 on the handle. The other ends of the springs have their hooked portions connected to eyes 34 secured to the circular members 7. It will thus be apparent that the jaws working against the tension of the springs are normally in closed position.

Referring to Figs. 8 and 10 the base or support 12' is provided with a spreader 35 which passes through the brace composed of upper and lower sections 36 and 37. The sections of the brace may be secured together by any suitable means 38. In order to give support to the brace it is preferably attached to the cross members 15' of the base. The spreader tapers inwardly from its center portion where it is substantially straight to its ends which are preferably formed with integral extensions 39 held in supporting blocks 40 secured to the end members 15. In order that the members 39 may be adjusted as to height and at the same time prevented from extending too far down into the blocks 40, stops in the form of nuts or the like 41 are secured to the members 39. Additional braces 42, secured to the transverse members 14' of the base by fastening means 38, act to keep the spreader separated.

The modified form of apparatus disclosed in Figs. 6 to 10 operate as follows:

The gripping jaws 25 of the tongs 23 at the bottom of the frame 4 are held in an open position by means of the spreader 35 over which the handles 26 are straddled. A pallet loaded with cases is placed in the frame 4 and an inverted pallet is then placed in the frame on the top of the uppermost cases. The turning device is then rotated 180°. As the device rotates the handles 26 of the tongs in the bottom of the frame are released from the spreader 35 and the jaws 25 of the tongs are drawn together by the two springs 32 connected to the handles 26, whereby the jaws firmly engage and hold the lowermost pallet to the frame while the frame is rotating. It will thus be apparent that after the frame is rotated 180° the jaws of the tongs which were in the bottom of the frame and separated by the spreader now hold the original lower pallet to the top of the frame free from the inverted load by gripping the center board of the pallet. Since the frame has been rotated 180° the pallet which was the upper pallet is now the lower pallet and is supporting the inverted load. Furthermore, the gripping jaws which were originally at the top of the frame upon reaching the bottom of the frame are separated by engaging the spreader 35. The operation is continuous and with each turning operation there is a pallet held in the top of the frame, which pallet is released from the jaws by means of the spreader separating the jaws, such pallet then serves as the bottom pallet when the load is inverted.

It is to be understood that various changes in the size, shape and arrangement of parts may be resorted to without departing from the spirit of the invention or the scope of the appended claims.

I claim:

1. A turning device comprising in combination a rotatable frame into which an article to be turned is adapted to be inserted, gripping means at the top of said frame when said frame is stationary for holding an article to the interior of the frame, and means independent of the frame for engaging and releasing said gripping means from the article when the frame is rotated.

2. Apparatus for inverting an article held between two pallets comprising in combination, a base, a frame rotatable upon said base, a plurality of gripping means on said frame, said gripping means comprising pivoted jaws and handles, said jaws extending toward the interior of the frame and said handles extending toward the exterior of the frame, means connected to the frame and the gripping means for normally keeping said jaws in closed position, and means on said base for opening said jaws of at least one of said gripping means when said frame is turned on said base.

3. Apparatus for inverting an article held between two pallets comprising in combination, a frame, opposed gripping means on said frame, said gripping means comprising jaws and handles, said jaws extending toward the interior of said frame and said handles extending toward the exterior of the frame, a base adapted to support said frame and spreader means on said base, said handles engaging said spreader means and opening the jaws at the bottom of the frame when the frame is turned on said base.

4. Apparatus for inverting an article comprising in combination, a frame, gripping means on said frame, said gripping means comprising jaws and handles, said jaws extending toward the interior of said frame and said handles extending toward the exterior of the frame, a base adapted to support said frame, spreader means on said base, a spreader means extending longitudinally of the base, said handles engaging and straddling said spreader means when the frame is inverted on said base, thereby opening said jaws.

5. Apparatus for inverting an article comprising in combination, a frame, opposed gripping means on said frame, said gripping means comprising pivoted jaws and handles, said jaws extending toward the interior of the frame and said handles extending toward the exterior of the frame, the jaws of one of said gripping means being adapted to engage and hold a pallet to the interior of the frame, flexible means attached to the frame and gripping means for normally keeping said jaws closed, and means extending transversely of said frame for engaging and limiting the movement of said handles, a base upon which said frame rotates and spreader means on the base adapted to engage the handles and open the gripping jaws at the bottom of the frame when said frame is rotated.

6. An apparatus for inverting an article comprising in combination, a frame, said frame adapted to receive and support opposed pallets between which an article to be inverted is supported, a base, means on the base for rotating the frame and automatic gripping means extending through said frame for holding one of said pallets to the interior of said frame when the other pallet is removed from said frame.

7. Apparatus for inverting an article comprising in combination, a frame, holding means on said frame, said holding means being adapted to hold an article being inverted to the interior of the frame, means on the frame for normally keeping said holding means in closed position and means carried by the frame for limiting the movement of said holding means, a base adapted to support said frame, and means on said base for opening said holding means when said frame is turned on the base.

8. Apparatus for inverting an article comprising in combination, a frame, holding means on said frame, said holding means extending toward and adapted to hold an article to the interior of said frame, and means on said frame for normally keeping said holding means in closed position, a base adapted to support said frame, and means on said base for engaging and opening said holding means at the bottom of the frame when the frame is turned on said base.

9. Apparatus for inverting an article comprising in combination, a frame, holding means on said frame, said holding means being provided with jaws, said jaws extending toward the interior of said frame, a base adapted to support said frame, and means on said base for engaging said holding means and opening said jaws when said frame is turned on the base.

10. Apparatus for inverting an article comprising in combination, a frame, holding means on said frame, said holding means being provided with jaws, said jaws extending toward the interior of said frame, means on said frame for normally keeping said jaws in closed position, a base adapted to support said frame, and means on said base for opening said jaws when the frame is turned on the base.

11. A frame, said frame adapted to receive a pair of pallets in spaced relation from each other, a base, means for rotating said frame relative to said base, a pair of spaced releasable means on and rotatable with said frame for positively holding said pallets inside said frame, and means for automatically releasing one of said releasable holding means as said last-named releasable holding means are rotated into proximity to said base.

12. A frame, said frame adapted to support pallets in spaced relation from each other, a base, means for rotating said frame on the base, a pair of spaced releasable means on and rotatable with said frame for positively holding said pallets inside said frame, and means for alternately releasing said releasable holding means from said pallets as said holding means are rotated into proximity to the base.

13. An apparatus for inverting an article, comprising a rotatable frame, two spaced pallets in said frame between which pallets an article to be inverted is supported, releasable holding means on and rotatable with said frame for engaging one of said pallets, and means independent of said frame for releasing said holding means from said pallet when said frame is rotated.

14. A turning device comprising in combination a rotatable frame, the interior of said frame being lined so as to form a substantially solid wall, gripping means extending through said substantially solid wall for holding an article to the interior of said frame, and means independent of said frame for releasing said gripping means from said article when the frame is rotated.

15. Apparatus for inverting a stack of cans, comprising an oscillatable drum provided with a central, rectangular opening constituting a goods-receiving compartment, said compartment being centrally arranged in said drum to minimize the resistance to oscillation of the drum due to the load of cans therein.

16. Apparatus for inverting a stack of cans, comprising a drum provided with a central, rectangular opening and a plurality of walls defining said opening, said walls paralleling tangents of the drum body and being adapted to confine the stack of cans during inversion.

17. Apparatus for inverting a stack of cans, comprising a pair of discs rigidly connected in spaced parallel relation to form a drum or the like, each of said discs being provided with a substantially centrally arranged rectangular opening, and four walls arranged in rectangular form to conform to said openings and spanning the space between said discs.

18. Apparatus for inverting a stack of palletized goods, comprising a drum provided with a centrally-arranged, rectangular opening, a plurality of walls defining the opening, the height of the opening corresponding to the height of the goods plus the thicknesses of two pallets, said walls being adapted to confine the goods while the drum is being inverted.

19. Apparatus for inverting a stack of cans, comprising a base member, anti-friction means supported thereon, and a drum mounted on said anti-friction means, said drum provided with a centrally-arranged non-circular opening adapted to receive and support a stack of cans.

20. In a device of the class described, an oscillatable drum provided with a centrally-arranged, rectangular opening extending therethrough, walls defining sides of the opening, a stack of palletized goods mounted in said opening, and a second pallet disposed in the opening above said stack whereby when said drum is oscillated to inverted position, the stack, supported on said second pallet, may be unitarily removed from said drum.

CHARLES E. STAFFORD.

REFERENCES CITED

The following references are of record in the file of this patent:

UNITED STATES PATENTS

| Number | Name | Date |
| --- | --- | --- |
| 615,554 | Hogan | Dec. 6, 1898 |
| 1,429,327 | Daniell | Sept. 19, 1922 |
| 1,447,428 | Ramsay | Mar. 6, 1923 |
| 1,486,609 | Schwab | Mar. 11, 1924 |
| 1,539,258 | Graupner | May 26, 1925 |
| 1,829,089 | Hall | Oct. 27, 1931 |
| 1,878,994 | Abbe | Sept. 27, 1932 |
| 1,967,683 | Ostrander | July 24, 1934 |
| 1,983,052 | Spiegel | Dec. 4, 1934 |
| 2,202,564 | Parker | May 28, 1940 |
| 2,277,310 | Engelhart | Mar. 24, 1942 |
| 2,337,528 | Stuckert | Dec. 21, 1943 |